United States Patent [19]

Gale

[11] Patent Number: 5,781,252
[45] Date of Patent: Jul. 14, 1998

[54] DUAL LIGHT VALVE COLOR PROJECTOR SYSTEM

[75] Inventor: Ronald P. Gale, Sharon, Mass.

[73] Assignee: Kopin Corporation, Taunton, Mass.

[21] Appl. No.: 627,727

[22] Filed: Apr. 2, 1996

[51] Int. Cl.⁶ ............................................. G02F 1/1335
[52] U.S. Cl. ....................................... 349/8; 349/57
[58] Field of Search ........................ 349/8, 9, 57, 201

[56] References Cited

U.S. PATENT DOCUMENTS

| Re. 25,169 | 5/1962 | Glenn et al. | 178/5.4 |
|---|---|---|---|
| 4,995,702 | 2/1991 | Aruga | 350/331 |
| 5,172,254 | 12/1992 | Atarashi et al. | 349/9 |
| 5,231,432 | 7/1993 | Glenn | 353/31 |
| 5,355,188 | 10/1994 | Biles et al. | 353/69 |
| 5,506,701 | 4/1996 | Ichikawa | 349/15 |
| 5,615,024 | 3/1997 | May et al. | 349/57 |

FOREIGN PATENT DOCUMENTS

| 3-150525 | 6/1991 | Japan | 349/9 |
|---|---|---|---|
| 95/26110 | 9/1995 | WIPO | |

*Primary Examiner*—Anita Pellman Gross
*Attorney, Agent, or Firm*—Hamilton, Brook, Smith & Reynolds, P.C.

[57] ABSTRACT

The present invention relates to a light valve projector in which a pair of high resolution active matrix transmission displays are used with a light source, coupling optics and a projection lens to provide a compact video or data presentation system. A preferred embodiment of the system comprises a two light valve system and a lamp within a compact housing where light from the lamp is directed through two active matrix displays using a pair of diffractive optical elements.

20 Claims, 9 Drawing Sheets

| LCD1 | Column 0 | Column 1 | Column 2 | Column 3 |
|---|---|---|---|---|
| Row 0 | G(0,0) | G(1,0) | G(2,0) | G(3,0) |
| Row 1 | R(0,1) + R(0,0) | B(1,1) + B(1,0) | R(2,1) + R(2,0) | B(3,1) + B(3,0) |
| Row 2 | G(0,2) | G(1,2) | G(2,2) | G(3,2) |
| Row 3 | R(0,3) + R(0,2) | B(1,3) + B(1,2) | R(2,3) + R(2,2) | B(3,3) + B(3,2) |

FIG. 8A

| LCD2 | Column 0 | Column 1 | Column 2 | Column 3 |
|---|---|---|---|---|
| Row 0 | B(0,0) + B(0,1) | R(1,0) + R(1,1) | B(2,0) + B(2,1) | R(3,0) + R(3,1) |
| Row 1 | G(0,1) | G(1,1) | G(2,1) | G(3,1) |
| Row 2 | B(0,2) + B(0,3) | R(1,2) + R(1,3) | B(2,2) + B(2,3) | R(3,2) + R(3,3) |
| Row 3 | G(0,3) | G(1,3) | G(2,3) | G(3,3) |

DUAL LIGHT VALVE COLOR PROJECTOR SYSTEM

BACKGROUND OF THE INVENTION

Light valve liquid crystal display systems have been developed to provide for projection of video and data images. For the projection of color images these display systems have utilized three active matrix liquid crystal displays which are typically aligned relative to dichroic mirrors which combine the three images, each having a distinct primary color, into a single colored image that is projected with a lens onto a viewing screen.

Existing light valve projection systems use several dichroic mirrors to separate light from a light source into three primary colors and to direct each of these primary colors through a separate light valve. These light valve systems use active matrix liquid crystal displays in which switching transistors are fabricated in polycrystalline silicon that has been deposited on glass. Attempts to fabricate small area high resolution displays using circuits fabricated on glass has met with limited success. Existing displays with a 640×480 pixel geometry, for example, have required displays with active areas in excess of 500 mm². The optics and alignment mechanism necessary to separate the colors and combine the generated images where all three light valves are of this size has necessitated system volumes, including the light source and projection lens, in excess of 1000 cubic inches and typically weighs more than 18 pounds.

A continuing need exists, however, for smaller more portable projection display systems which have high resolution and full color capabilities, and at the same time are readily and inexpensively manufactured.

SUMMARY OF THE INVENTION

The present invention relates to a compact projector utilizing a dual light valve system to form and project high resolution images on a viewing surface. A preferred embodiment of the projector employs a pair of light valves in an optical system to separate light from a light source along two optical paths. The light of each separate path is directed through one of the light valves and then combines the images formed by each light valve into a color image that is directed through a projection lens onto the viewing surface.

A first polarizing prism is used to separate light from the source into two polarized components with a first component having a plurality of colors, preferably red, green and blue, being directed along the first optical path and the second polarization component having a plurality of colors being directed along the second optical path. By recombining the two polarization components, the system minimizes the loss of optical efficiency found in many existing systems which fail to recover one polarization component.

Along each light path is a color separation system that separates the light into a plurality of colors. In a preferred embodiment a phase plate is used to separate light components of different colors and distribute the light for transmission through each light valve. The two light valves are mounted to a polarizing prism which combines the two generated images into a single color image. The advantage of this approach is the increase of the image resolution afforded by the use of two light valves relative to the use of a single light valve having three separate colors. Instead of three pixels being used to generate a single image pixel in the single light valve system a combination of pixels from two light valves are used to generate an image pixel. A preferred embodiment of this system utilizes all of the color information in green and about half of the information in red and blue. Other combinations can also be used. As more of the available light is used a brighter image is produced relative to single valve systems.

Another preferred embodiment for a color separation system uses a color filter array that can be incorporated with the light valve display to provide a plurality of colors.

Unlike existing color projectors using three valves, which are limited by their size, weight, and resolution, the present invention employs a pair of high resolution active matrix light valves where each light valve in the color projector system, for example, has an active area with a diagonal dimension between 15 mm and 40 mm and a pixel resolution of at least 300,000 within the active area. By reducing the number of light valves while maintaining a high resolution, the overall size and weight of the system can be substantially reduced. The term pixel resolution, for the purposes of this application, refers to the number of pixel electrodes in a light valve that provide separate points or "dots" within the image that is generated. Thus, for example, a single monochrome 640×480 light valve has a pixel resolution of over 300,000, as each of the 307,200 pixel electrodes corresponds to a point within the generated image. For a single color light valve using triads of three pixel electrodes, each corresponding to a primary color, a pixel resolution of 300,000 requires at least 900,000 pixel electrodes to be fabricated within the active area.

By contrast, the pixel resolution of the present dual light valve system will depend upon the number of pixel electrodes in each display and the alignment of the two displays. In one embodiment, the pixel electrodes are aligned with each other to provide a system in which only two pixel electrodes in the combined image are needed to produce three color components. However, the color content of the combined image has preferably been biased to enhance luminescence. That is, all of the green information contained in the original image has been retained. As some of the red and blue content of the display has been limited, the chromaticity of the resulting image has also been limited. The system does operate, however, to substantially increase the retained color content relative to a monochrome display and substantially increases the system pixel resolution relative to a single color filter display. The pixel electrodes for the two displays can also be partially or fully offset to increase pixel resolution. A preferred embodiment of the present invention will have arrays of 640×480, for example, in each light valve such that each light valve has at least 300,000 pixels which are fully offset to provide a system pixel resolution of at least 200,000.

Another preferred embodiment of the invention is adapted for use with high definition television having a rectangular format of 16×9 with an aspect ratio of about 1.8. Light valves having between a 960×540 array (at least 500,000 pixel electrodes) and a 1920×1080 array (at least 2,000,000 pixel electrodes) are suitable for use with this wide angle format.

Another preferred embodiment utilizes a pair of lower resolution displays with diffractive optical elements to increase the pixel resolution over single light valve displays. Thus two identical monochrome displays having less than 300,000 pixel electrodes can be used in combination with diffractive optical elements or color filters to provide a color imaging system having increased pixel resolution relative to a single color filter light increased valve and without the increase in cost, size and weight resulting from the use of three light valves.

An electronics module adapted for use with the present invention selectively drives the two displays such that pixel electrodes for each display within each color region generate the desired color mixture. This can involve averaging of two bits of adjacent data to better simulate the colors being imaged.

To maintain the brightness of the projector, a small high intensity lamp is needed to deliver sufficient light along the optical path between the source and the projection lens without the use of large condenser or focussing optics. Xenon or metal halide arc lamps are used in preferred embodiments having 15–150 Watts of output power in the visible spectrum. A preferred embodiment of the arc lamp produces between 50 and 125 watts and uses an arc gap equal to or less than 2 mm, and preferably in the range of 0.5–1.0 mm, and uses an elliptical or parabolic reflector to provide a beam shape and intensity highly suitable for the smaller active area of the light valves being used. When the arc gap of the lamp is less than 2 mm the output beam divergence of the lamp is reduced. A small reflector with a diameter of about 75 mm or less is used with the lamp and fits within a compact housing. The smaller and brighter beams reduces the size of the coupling optics necessary to direct light efficiently through the light valve system.

A further preferred embodiment provides a pixel resolution of at least 800,000. Where each valve has a 1280×1024 array within an active area of less than 320 mm$^2$ this resolution can be obtained. This can be achieved using the transferred thin film circuit processes described in U.S. Pat. Nos. 5,206,749, 5,256,562 and 5,317,436, the entire contents of which are all incorporated herein by reference. Circuits having pixel areas between 100 um$^2$ and 1000 um$^2$ can be fabricated using the processes described in the above referenced patents. These circuits have been used to fabricate liquid crystal displays in which the optical aperture of each pixel is approximately 40% geometrical transmission.

The light source and associated power supply, the light valve system, coupling optics, projection lens and light valve driving circuits can be configured within a projector housing having several preferred embodiments including projection onto an external viewing surface or projection onto a screen of a rear projection system.

The projection lens is preferably a zoom lens that produces projected images at distances from 1 meter to 6 meters from the projector. The zoom range is about 1.6–1.7. The focal length is between 35–55 mm.

DETAILED DESCRIPTION OF PREFERRED EMBODIMENTS

Figure 1:
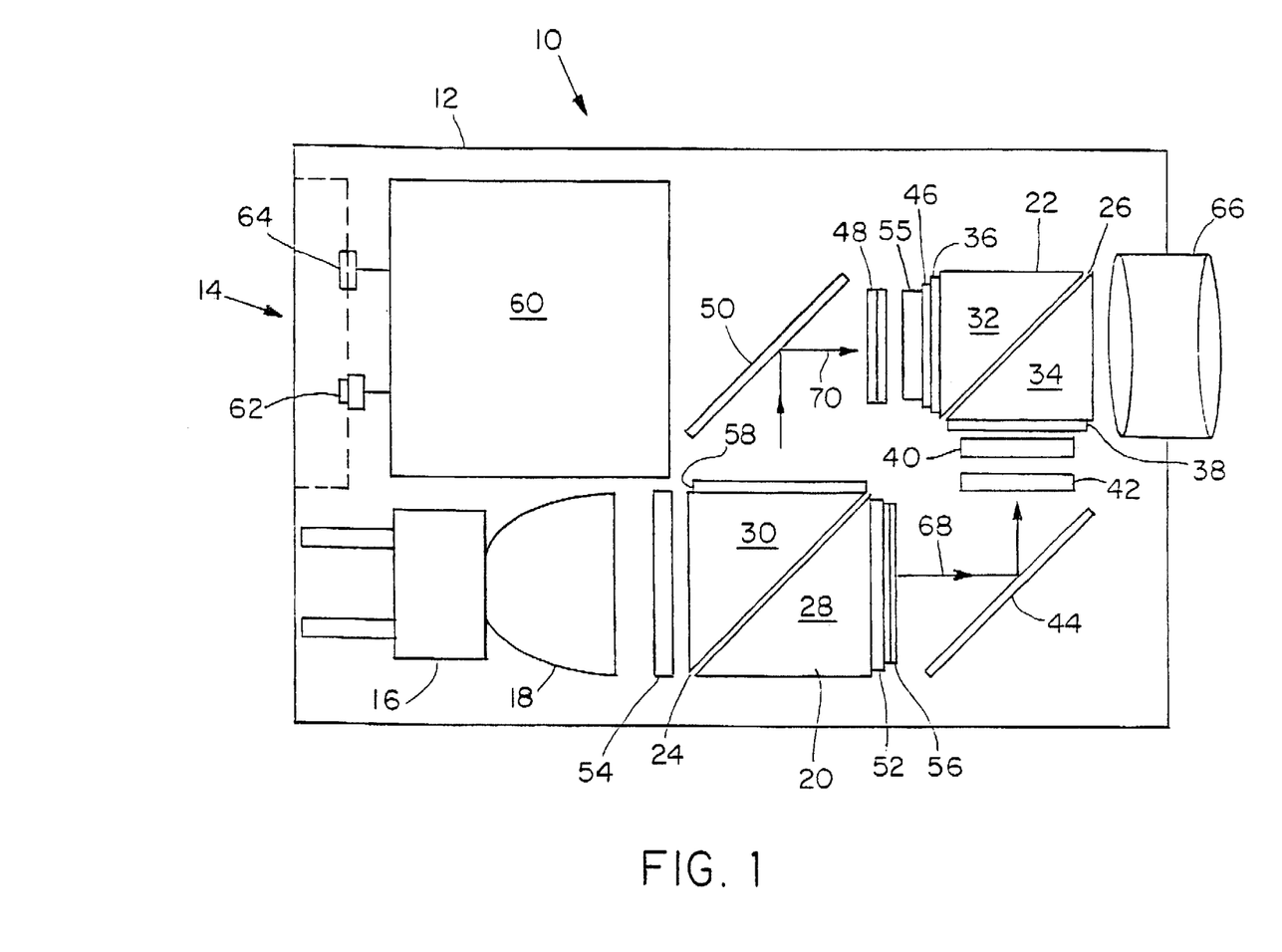
FIG. 1 is a schematic diagram of a dual light valve system in accordance with the invention.

As illustrated in FIG. 1, a preferred embodiment of the invention is a compact projector 10 having a housing 12 in which the dual light valve system is enclosed.

The system 10 includes a light source 16, a reflector 18 to direct the light through a filter 54 and into a polarizing prism 20 which splits the light along two optical paths 68, 70.

Light directed along path 68 is first directed through film polarizer 52, half wave plate 56, is reflected by mirror 44 onto lens array 42, through the light valve system 40 and film polarizer 38 into the combining polarizing prism 22.

Light directed along path 70 is first directed through film polarizer 58, is reflected by mirror 50 through lens array 48, a second light valve system 46, half wave plate 55 and polarizer 36 into combiner 22. The combiner 22 combines the two images to form a single image that is projected onto viewing surface with projection lens 66.

The circuitry 60 for control of the light valves and the power supply are located within the housing 12 and are connected to a video source and external power at connectors 62,64 of connection panel 14. The circuitry includes a display driver circuit which receives a standard color video or data signal and selectively alters the color content such that the pixel electrodes of the two displays within a color pixel region of the combined image are actuated to produce a color distribution in the color pixel region that best approximates the received image at any given time. For example, adjacent red pixel data and/or adjacent blue pixel data can be averaged to form single pixel data to be included within each color pixel region.

Source 16 is preferably a xenon or metal halide arc lamp having a color temperature in the range between 4000 and 9000 degrees and having an arc gap of less than 2 mm, and preferably in the range of 0.5–1.6 mm. The smaller arc lamp provides for the capture of a higher percentage of the output light. The use of a small diameter reflector that is about 75 mm in outer diameter or less in a preferred embodiment fits within a compact housing as described below.

Polarizing prisms 20,22 can be made as shown in FIG. 1 using prisms 28,30 and prisms 32,34, respectively. The prism elements are cemented together using optically transparent cement.

In a preferred embodiment of the present invention, each light valve has at least 300,000 pixel electrodes and can have as many as 2,000,000 or more pixel electrodes. The pixel electrodes transmitting light through each valve define an active area which is preferably between 250 mm$^2$ and 500 mm$^2$ or have a diagonal dimension of between 15 mm and 30 mm in a rectangular geometry. The displays are made using processes described in greater detail below and in the U.S. Patents and applications referenced herein.

A preferred embodiment uses two light valves having 640×480 arrays. A higher resolution embodiment uses a 1280×1024 array to provide a pixel resolution of over 600,000.

The projector of FIG. 1 can have control buttons seated on top or side of the housing 12 and provide a means for adjusting the projector output, for example: brightness, contrast, tuning, color, balance, focus, and volume. They also permit a user to add graphs or text to the output, save an output, reset an output and control output positioning. Signals are received from a remote control at remote control sensor window. A handle is provided on the top or side of the housing 12 for transporting the unit. Projector output is provided at output lens positioned on the front face of housing 12. The focus knob controls the magnification of the output lens. Both zoom and focus controls can be manual or motorized. An audio speaker or a pair of speakers can be provided in the projector housing.

A remote control can attach to the rear face of the housing 12. The remote control includes a set of control buttons for controlling the projector which are similar to the control buttons on the housing 12. The remote control communicates with the projector by transmitting an infrared signal to the remote control receiver window on the front face of the housing 12. Power is transferred to the unit at power jack and controlled by power switch. Video input is provided at a video jack.

The projector is coupled to an external power source, and is also coupled to a remote video source which provides video signals and can also provide audio and data signals to the display system. In addition, the video circuitry 60 can receive control signals(e.g. mouse signals). The video source can be a computer, a video player, a television station, or any other video source coupled to the projector by a direct wire, an antenna or both. Circuitry in the projector separates the audio signals from the input stream and generates analog signals to drive internal or remote speakers. Circuitry within the projector also separates video signals from the input stream, possibly manipulating the video data stream, and provides the video information to the light valve display panels.

Side metal plates are used to attach the light valves with brackets to the prism 22. The brackets for mounting light valve adjacent to surface is described in greater detail in U.S. Ser. No. 08/111,131 filed on Aug. 25, 1993, the entire contents of which are incorporated herein by reference.

Figure 2:
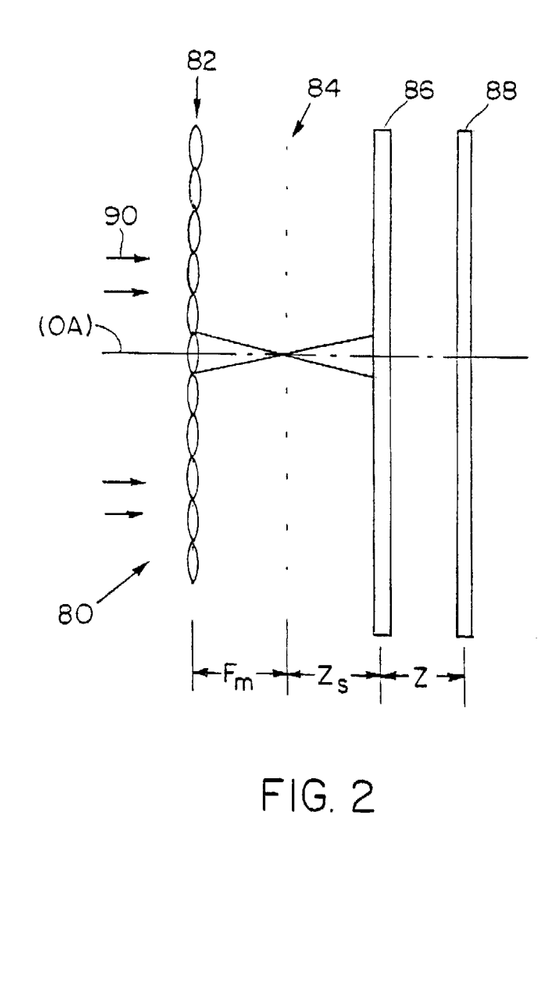
FIG. 2 is a detailed cross-sectional schematic of the phase plate light valve system used in the dual light valve system of the present invention.

FIG. 2 shows a detailed schematic view of the phase plate and light valve assembly in accordance with the invention. In this embodiment, a lens array 82 is used to control the delivery of light onto a phase plate 86 that selectively diffracts the incident light 90 in a fixed pattern onto the pixel electrode array of light valve 88. Further details regarding the fabrication and use of diffractive optical elements or phase plates can be found in U.S. Ser. No. 08/565,098 filed on Nov. 30, 1995, the entire contents of which are incorporated herein by reference.

A lenslet array 82 (in one embodiment cylindrical lenslets), is placed between the incident light 90 and the multilevel phase element 86. To properly obtain efficient coupling between the array 82, the phase element 86 and the light valve, there are certain geometrical requirements. The focal length of each lenslet is $F_m$, and the distance between the lenslet array 82 and the multilevel phase element 86 is $Z_s + F_m$. $Z_s$ is the distance between the plane of the imaged source 84 and the multilevel phase element 86. Each lenslet focusses an image of the source, at a distance $F_m$ from the lenslet array 82. Each of these imaged sources 84 is of physical dimension, $S_m$, in the x-dimension, where $S_m = (F_m S_c)/F_c$ centered about the optical axis of the respective lenslet. For an image 84 of dimension $S_m$ that lies on the optical axis of the condensing lens, a Fresnel diffraction calculation indicates that the light amplitude distribution at a distance Z from the multilevel phase element 11 is given by the expression:

$$U'_{z(x)} = \exp\left[ i\frac{\pi}{\lambda} \frac{x^2}{Z+Z_s} \right] \left[ a_0 + \right.$$

$$\left. \sum_n \exp\left[ -i\pi\lambda \frac{n^2}{T^2} \frac{Z_s Z}{Z+Z_s} \right] \exp\left[ -i2\pi \frac{n}{T} \frac{Z_s}{Z+Z_s} x \right] \right]$$

in which the irrelevant constant factors have been neglected. The first exponential term in the series is the wavefront curvature introduced by each lenslet. The first exponential term after the summation sign represents the phase shifts incurred by the various diffraction orders. Again, what is desired is for all of the phase shifts for value of n which do not result in integers, when divided by three, be equal to ⅓ wave. For this to be the case, Z must be given by the expression:

$$Z = \frac{2T^2 Z_s}{3\lambda Z_s - 2T^2}$$

Hence, in a manner similar to the case without lenslets, the value of Z should be chosen such that:

$$\frac{2T^2 Z_s}{3\lambda_{long} Z_s - 2T^2} < Z < \frac{2T^2 Z_s}{3\lambda_{short} Z_s - 2T^2}$$

wherein T is the periodicity of said multilevel optical phase element, $Z_s$ is equal to the distance between said multilevel optical phase element and said lenslets minus the focal length of said lenslets, $\lambda_{long}$ is the longest wavelength of interest and $\lambda_{short}$ is the shortest wavelength of interest.

Comparing this relationship with the relationship previously shown for $Z^{1/3}$(the optimum distance for the plane wave illumination case):

$$\frac{Z_{1/3}}{Z} = 1 - \frac{2T^2}{3\lambda Z_s}$$

As $Z_s$ approaches infinity, the distance, Z, approaches $Z^{1/3}$, as is expected. For finite source distance $Z_s$, the optimum Z distance is greater than the plane wave distance $Z^{1/3}$.

The last exponential term indicates that the period of the light distribution at the optimum Z distance is no longer equal to the period of the original phase grating. In effect, free-space propagation from a source located a finite distance from the grating 86 results in a magnification. This magnification, M, is given by the equation:

$$\frac{1}{M} = 1 - \frac{Z}{Z_s}$$

Note that for a finite source definition, $Z_s$, the magnification factor is greater than one.

The angular source size of the extended source as seen at the grating 86 is $S_m/Z_s$. This angular source size results in a new blur dimension, $b_n$, given by the expression:

$$b_n = \frac{S_m}{Z_s} Z = \frac{2T^2}{3\lambda Z_s - 2T^2} S_m$$

Because of the magnification described above, the new period of the image pattern is, $T_n$:

$$T_n = MT = \frac{3\lambda Z_s T}{3\lambda Z_s - 2T^2}$$

The resulting fractional blur of the image pattern can now be described by the relationships:

$$\frac{b_n}{T_n} = \frac{2T}{3\lambda Z_s} \quad S_m = \frac{2T}{3\lambda Z_s} \frac{F_m}{F_c} S_c$$

The fractional blur, with the lenslet array 82 in position, can be directly related to the fractional blur, b/T, without the lenslet array 82, according to the expression:

$$\frac{b_n}{T_n} = \frac{b}{T} \frac{F_m}{Z_s}$$

This relationship clearly shows that the blurring can be dramatically reduced by the proper introduction of the lenslet array 82. The reduction factor of the blurring is the ratio $F_m/Z_s$.

So far, consideration has only been given to one example lenslet that is centered on the optical axis (OA) of a condensing lens directing the light 90 onto the array 82. Additional lenslets placed adjacent to the example lenslet behave in a manner identical to that described above for the example lenslet. However, because of a coherent interaction between the light traversing different lenslets, an additional constraint is placed on the allowable center-to-center spacings of the lenslets. The minimum center-to-center spacing distance of the lenslets, L, is given by the expression:

$$L = pT = \left( \frac{Z + Z_s}{Z} \right)$$

where p is a positive integer.

Figure 3:
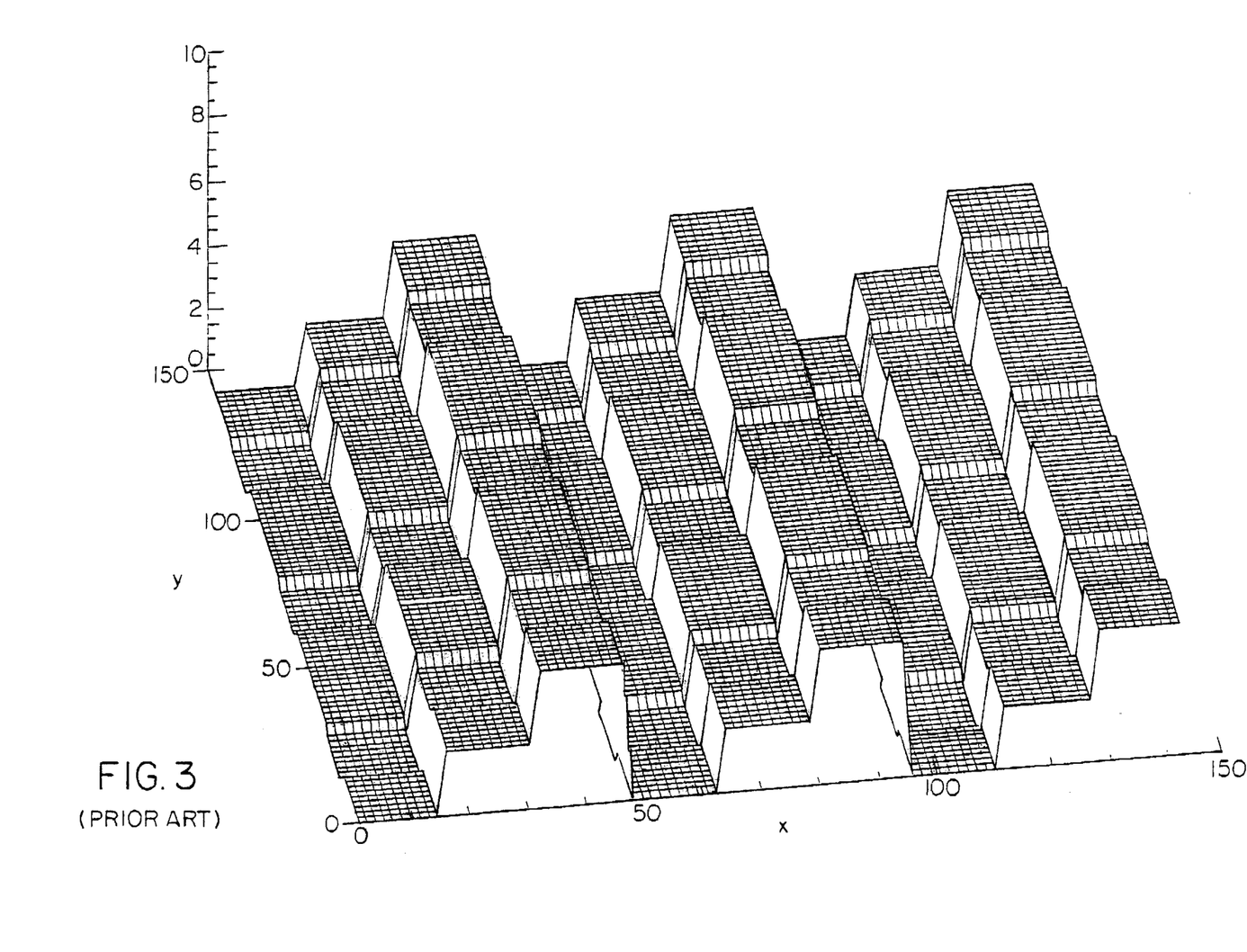
FIG. 3 illustrates a partial perspective enlarged view of a phase plate surface.

FIG. 3 is a perspective view of a prior art multilevel phase element used to separate colors for transmission through a light valve display and which in this particular embodiment repeats periodically in both the x an y directions. Such a configuration permits the incident light to be compressed both in the x-direction and also in the y-direction. Methods for forming such multilevel phase elements are well known to those skilled in the art. In particular a method for forming such multilevel diffractive optical elements is disclosed in U.S. Pat. No. 4,895,790 to Swanson and Veldkamp, the teachings of which are incorporated herein by reference.

Figure 4A:
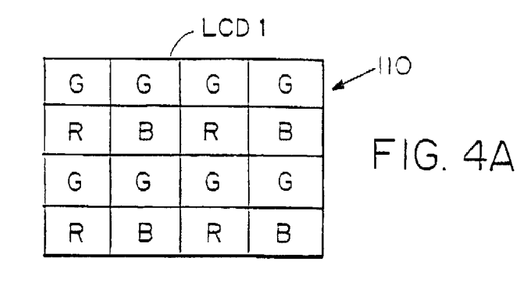
FIGS. 4A–4C illustrate a preferred embodiment for the pixel geometry of the dual light valve system.
Figure 4B:
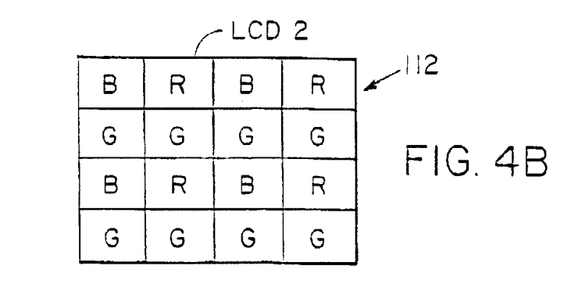
Figure 4C:
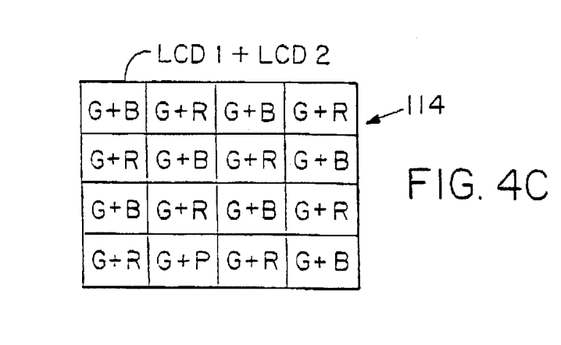

Of critical importance to the dual light valve system of the present invention is the arrangement of the color distribution among the pixel electrodes of each light valve and the alignment of the two light valves on the optical combiner. A preferred embodiment for distributing the colors on the two light valves in accordance with the invention is illustrated in FIGS. 4A and 4B. In this embodiment the first display 110 has a color distribution in which every other row is green and each intervening row alternates between red and blue. In the second display 112 in FIG. 4B the color distribution is reversed such that when the two displays area precisely aligned relative to the combiner, each projected pixel is a combination of either green and blue or green and red (FIG. 4C).

Figure 5A:
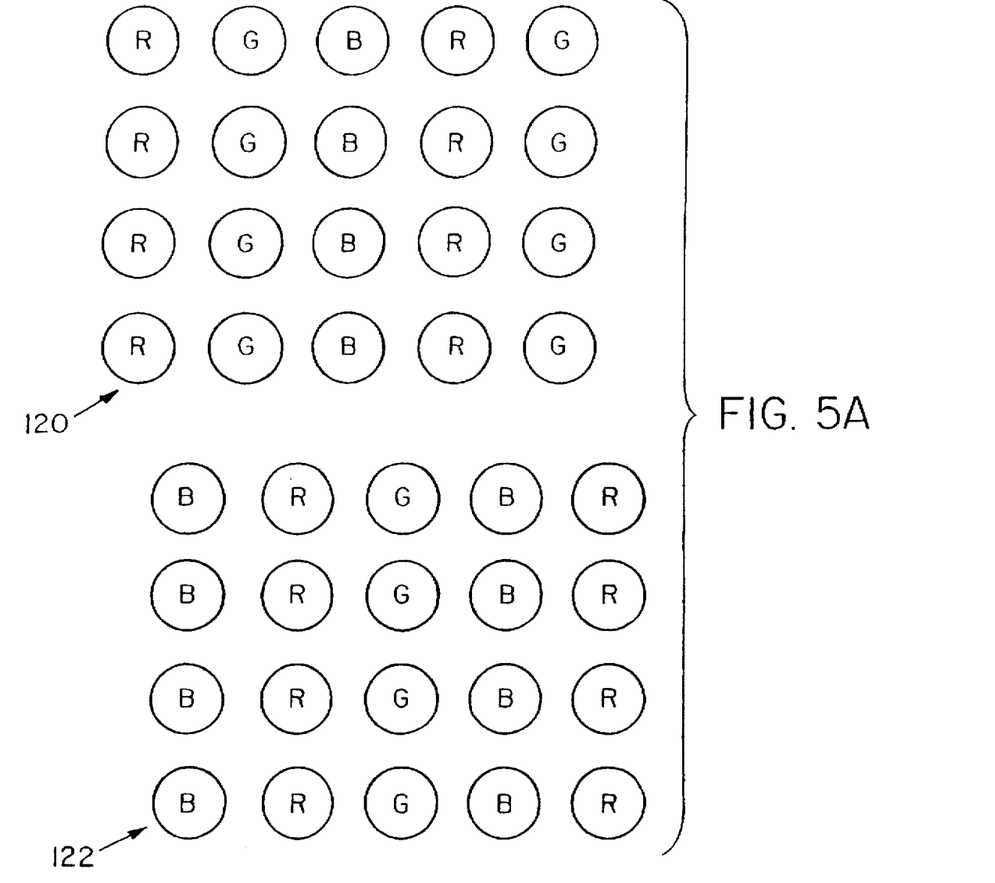
FIGS. 5A and 5B illustrate another preferred embodiment for the pixel geometry of a dual light valve system in accordance with the invention.
Figure 5B:
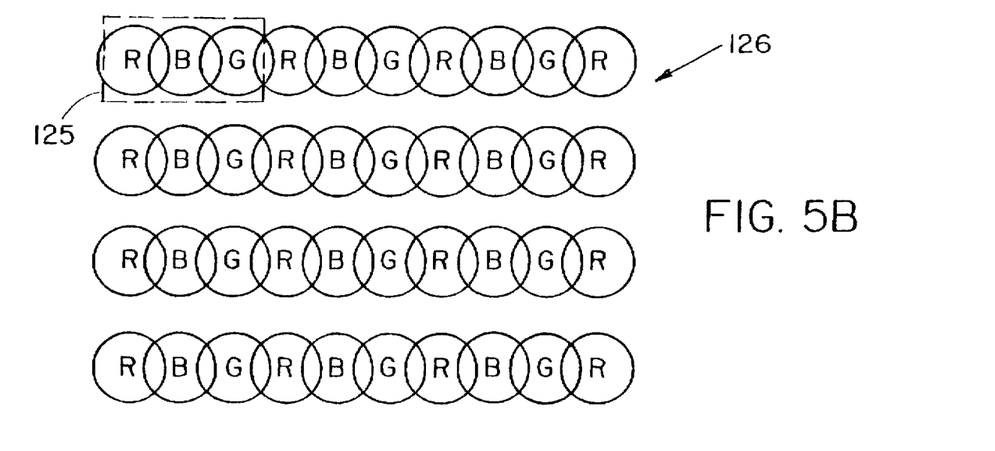

Another preferred embodiment of the present invention (FIG. 5A) involves a pixel configuration where the columns of the first display 120 are all red, green or blue. The corresponding columns in the second display 122 are blue, red or green. The displays 120 and 122 are positioned with the combiner such that the columns are offset by about half the distance between adjacent pixels. The resulting projected image shown in FIG. 5B illustrates that the image is constructed from color regions 125 made up of three colors.

Figure 6A:
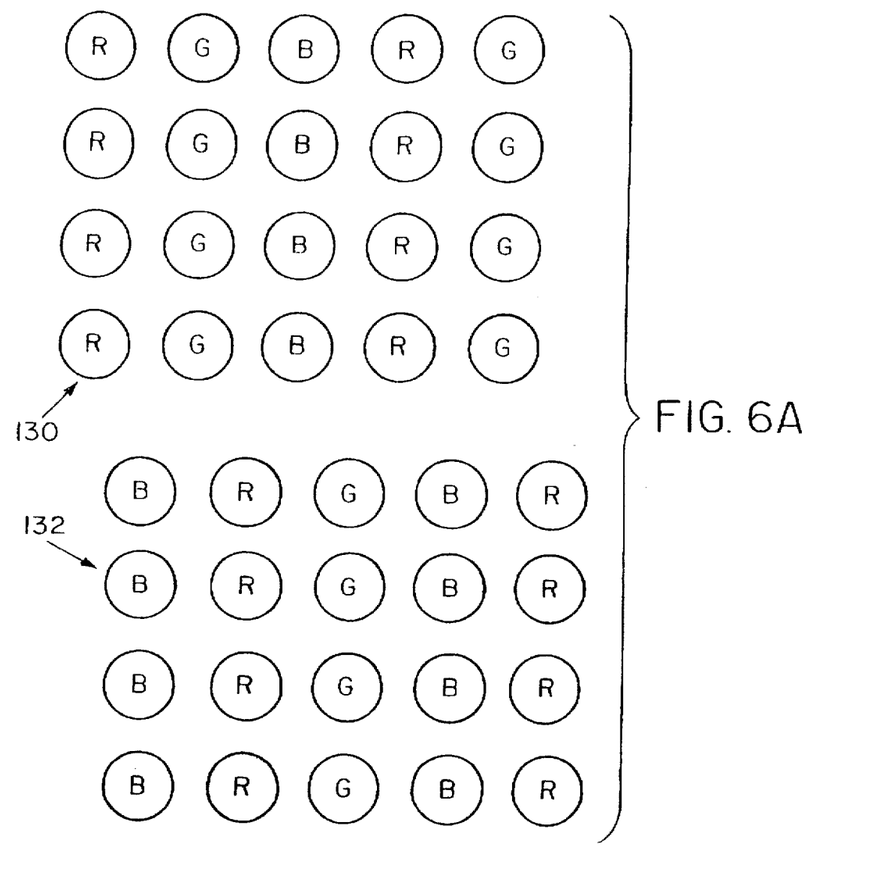
FIGS. 6A and 6B illustrate another preferred embodiment for the pixel geometry of a dual light valve display in accordance with the invention.
Figure 6B:
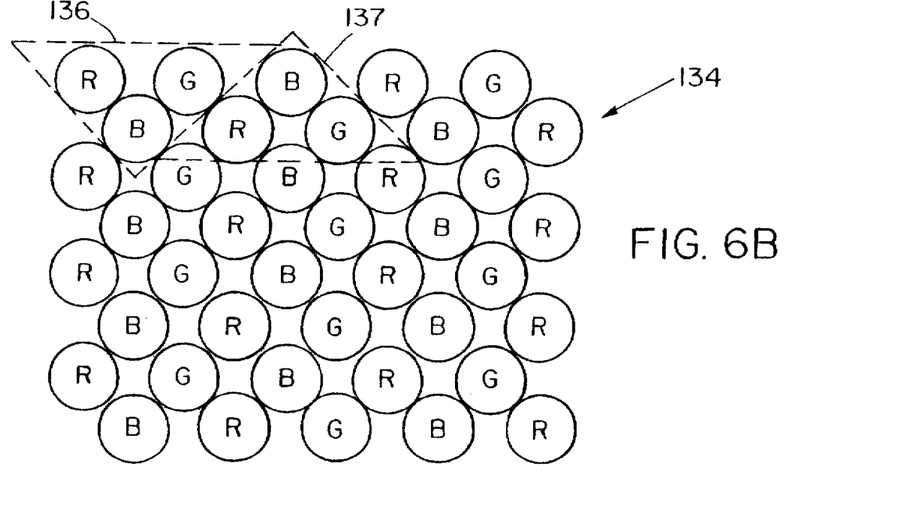

Another preferred embodiment is illustrated in connection with FIG. 6A and 6B. In this embodiment the first display 130 and second display 132 have columns as previously described, however the displays are offset in two directions as seen in FIG. 6B to form projected triad color regions 136 and 137.

Figure 7A:
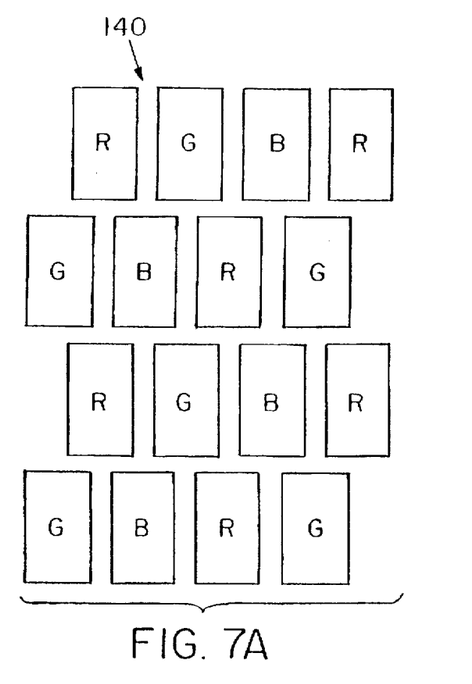
FIGS. 7A–7C illustrate another preferred embodiment for the pixel geometry of a dual light valve system in accordance with the invention.
Figure 7B:
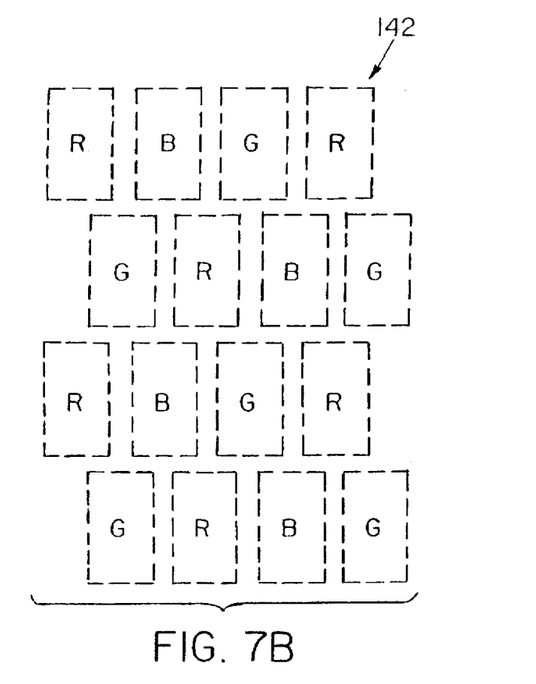
Figure 7C:
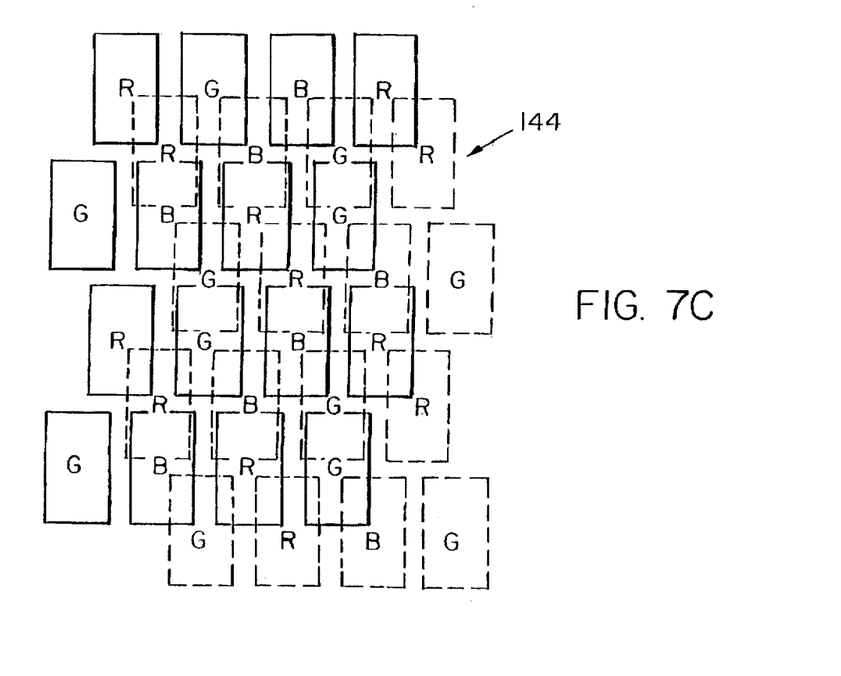

Another preferred embodiment is illustrated in FIGS. 7A–7C. In this embodiment, the pixel electrodes of displays 140 and 142 have a stripped layout that are mirror images of one another. The displays are vertically and horizontally misaligned to form the combined projected image 144 in FIG. 7C.

Figure 8A:
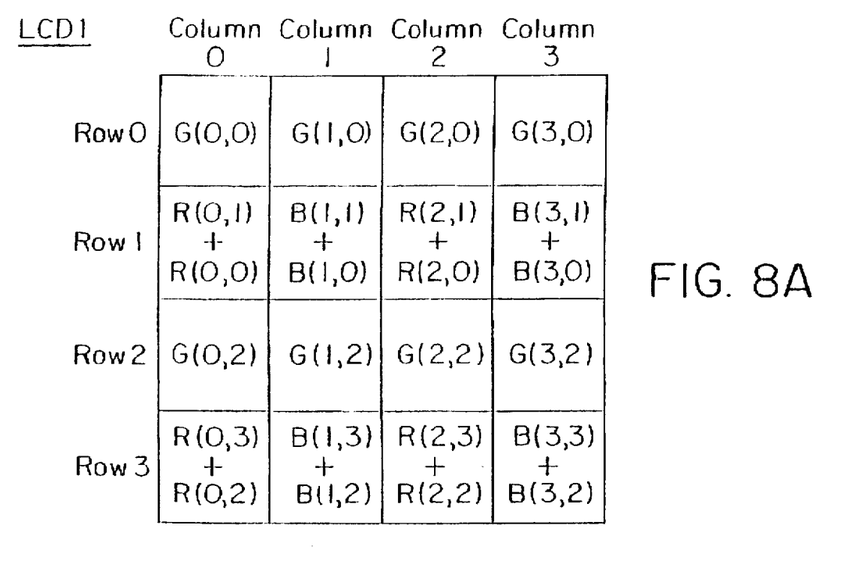
FIGS. 8A and 8B schematically illustrate a method for averaging of adjacent pixel color information.
Figure 8B:
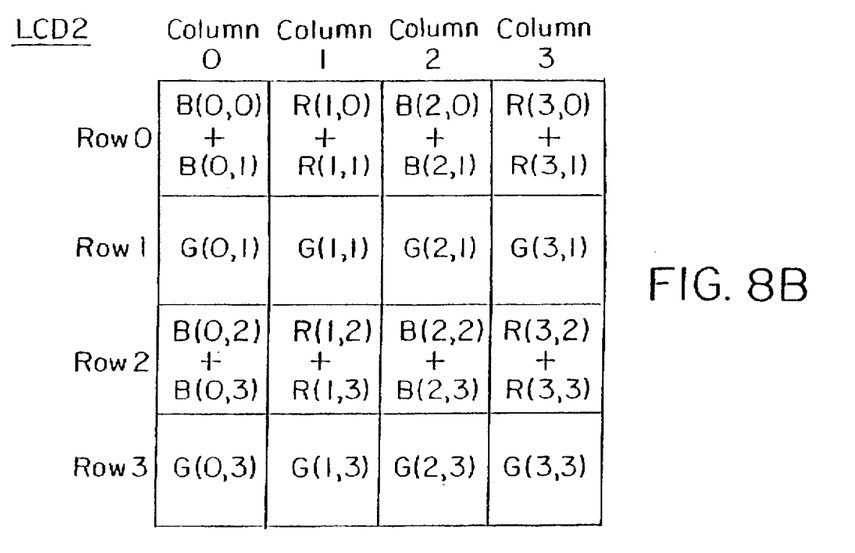

A preferred method for averaging bits of data to reduce the loss of red and blue information, for example, is schematically illustrated in FIGS. 8A and 8B. In this representation, even rows of green information (via the input signal from the row driver circuit) are mapped on LCD1 and odd rows of green information are mapped of LCD2, providing complete delivery of the green input information to the viewer. Red information from even columns is averaged between two adjacent rows and mapped onto odd rows of the corresponding even columns on LCD1, while the red information from odd columns is averaged between two adjacent rows and mapped onto even rows of the corresponding odd columns on LCD2. Blue information is handled in a similar manner to the red information. Blue information from even columns is averaged between two adjacent rows and mapped onto even rows of the corresponding even columns on LCD2, while the blue information from odd columns in averaged between two adjacent rows and mapped onto odd rows of the corresponding odd columns on LCD1. This example illustrates a method of combining input data of two of the colors to reduce the loss of color content in a dual light valve system.

Figure 9A:
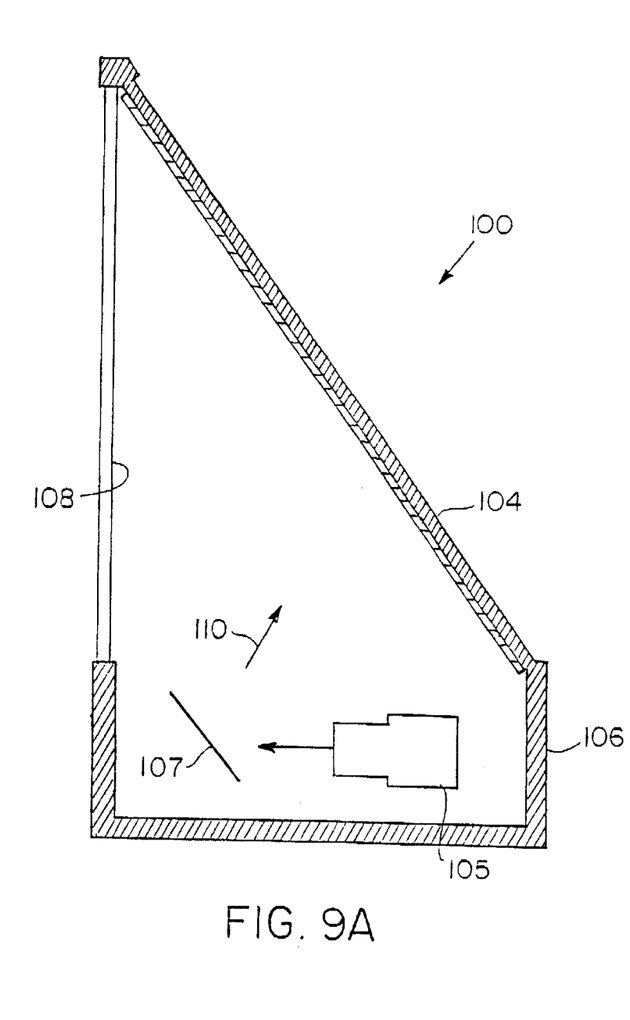
FIG. 9A is a cross-sectional view of a rear projection system in accordance with the invention.
Figure 9B:
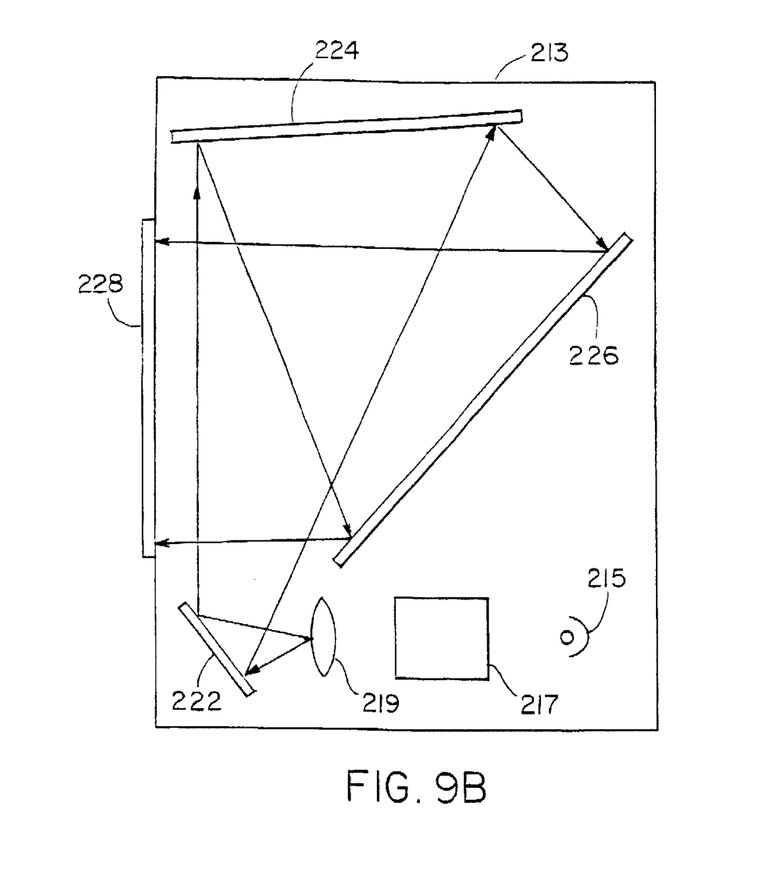
FIG. 9B is a cross-sectional view of another preferred embodiment of a rear projection system in accordance with the invention.

Illustrated in FIG. 9A is a preferred embodiment of a rear projection system 100 using the dual valve system previously described in connection with FIG. 1. A housing 106 encloses the light valve system 105 with projection optics that directs the image onto a mirror 107 which reflects the image along path 110 to mirror 104 and onto a rear projection view screen 108. FIG. 9B illustrates another embodiment of a rear projection system 213 in which 215, light valve system 217, projection optics 219 and mirror 222 direct the image against upper mirror 224 and rear mirror 226 onto screen 228.

Figure 10:
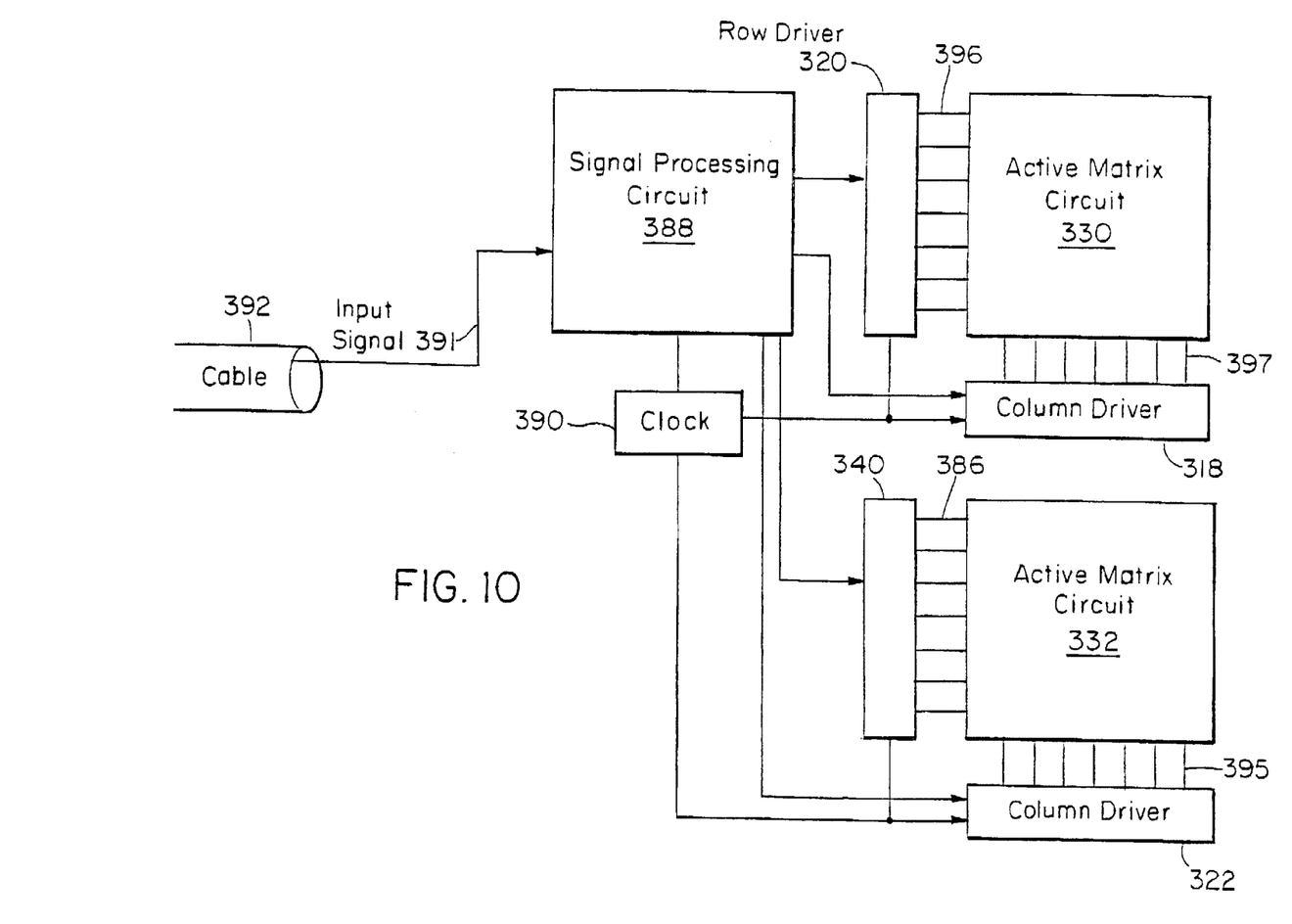
FIG. 10 is a schematic circuit diagram for a dual light valve system in accordance with the invention.

A preferred embodiment of a dual light valve system utilizes the circuit illustrated schematically in FIG. 10 in which cable 392 delivers video input signals 391 to a signal processing circuit 388. Circuit 388 and clock 390 control the delivery of images to first and second active matrix circuits 330,332. Each active matrix display has a row driver circuit 320,340 connected to a respective active matrix along row lines 398 and 386, as well as column driver circuits 318 and 322 connected to a respective active matrix along column liens 397 and 395.

Equivalents

While this invention has been particularly shown and described with reference to preferred embodiments thereof, it will be understood by those skilled in the art that various changes in form and details may be made therein without departing from the spirit and scope of the invention as defined by the appended claims.

I claim:

1. A light valve projection system comprising:

a light source;

an optical splitter positioned to receive light from the source and to separate the light along first and second optical paths;

a first light valve and a second light valve, the first light valve positioned on the first optical path to receive light from the source having a first plurality of colors and the second light valve being positioned on the second optical path to receive a second plurality of colors, the second plurality of colors having a different distribution from the first plurality of colors;

an optical combiner that combines a pair of images generated by the first light valve and the second light valve; and a projection lens positioned to receive light directed through the combiner and to project the light onto a viewing surface.

2. The light valve projection system of claim 1 wherein each light valve comprises an active matrix liquid crystal display.

3. The light valve projection system of claim 1 further comprising a phase plate to separate light incident on the first light valve into the plurality of colors.

4. The light valve projection system of claim 1 further comprising a projection housing in which the light source, the optical splitter, the first and second light valves, the optical combiner and projection lens are housed.

5. The light valve projection system of claim 4 wherein the housing further comprises a control panel on a surface.

6. The light valve projection system of claim 1 wherein the light source comprises an arc lamp, the arc lamp being a xenon arc lamp or a metal halide arc lamp.

7. The light valve projection system of claim 1 wherein the optical splitter is a polarization separator.

8. The light valve projection system of claim 1 further comprising a video processing circuit connected to a column driver circuit and a row driver circuit for each light valve.

9. A light valve color projector comprising:

a housing;

a light source within the housing directing light in a first direction along an optical path;

a projection lens positioned to receive light directed from the source through a light valve system;

the light valve system having a pair of diffractive optical elements, each element having a multilevel phase plate, and a pair of light valves that generate a pair of color images having different colors, the light valve system further having a combiner that combines the plurality of images to form a single colored image, the light valve system positioned along the optical path between the light source and the projection lens such that the projection lens projects the combined colored image onto a viewing surface.

10. The color projection of claim 9 wherein the housing has a horizontal plane such that the projection lens and light source are positioned in the horizontal plane.

11. The color projector of claim 9 wherein the combiner includes a plurality of prisms, the prisms being bonded together to form a combining element.

12. The color projector of claim 9 wherein the diffractive optical elements separate light transmitted through each light valve into red, blue and green components.

13. The color projector of claim 9 further comprising an optical splitter that receives light from the light source along the optical path and separates the light along a second optical path and a third optical path, the light along the second path having a plurality of colors and the light along the third optical path having a plurality of colors.

14. The color projector of claim 13 wherein the optical splitter is a polarization separator.

15. The color projector of claim 9 further comprising a video processing circuit connected to a column driver circuit and a row driver circuit for each light valve.

16. A method of forming a color image comprising:

directing light from a light source along an optical path;

splitting the light such that light is directed through a first light valve and a second light valve;

forming a first image with the first light valve and forming a second image with the second light valve, the first image and the second image each having a different distribution of a plurality of primary colors; and combining the first image and the second image.

17. The method of claim 16 further comprising providing a diffractive optical element to separate light directed through the first light valve into a plurality of colors.

18. The method of claim 17 further comprising separating the light with the diffractive optical element into red, green and blue components and projecting the combined image onto a rear projection screen.

19. The method of claim 16 further comprising providing a first light valve having a first driver circuit and a second light valve having a second driver circuit.

20. The method of claim 19 wherein the first driver circuit actuates pixel electrodes in the first light valve having a plurality of colors and the second driver circuit actuates pixel electrodes in the second light valve having a plurality of colors.

* * * * *